(12) United States Patent
Kidder

(10) Patent No.: X9320
(45) Date of Patent: Jan. 15, 1836

(54) CEMENT, HYDRAULIC

(76) Inventor: Levi Kidder

9320X 1-15-1836

Levi Ridder

Letters Patent

The Schedule referred to in these Letters Patent and making part of the same containing a description in the words of the said Levi Ridder himself of his improvement in the Covers of wells Cisterns Cess pools &c.

These covers are cast whole or in sections and in any desired shape or moulds of earth in the following way. for an arched or dome shaped cover. which is considered the best form. in a shop or other place for manufacturing. a mound of earth is erected and packed firmly in the shape of an arch or dome of dimensions as to height and diameter suited to the use and strength required of the cover. This arch or dome of earth forms the mould on which is cast the cover, and which determines the shape. Then for the purpose of forming an aperture in the cover by which to enter the vessel there is set and fixed on any part of the mould which will give to such aperture the place wanted. a removeable frame or curb of wood or other substance about six inches high. round square or of any shape and dimensions desired for such aperture. This done upon the mould all over except within the frame or curb is cast the cement mortar in thickness about four inches or any thickness required for strength. And this mortar being smoothly moulded on the surface the cover is done requiring only time to set or harden to be fit for use. But the cover now described is whole or in one undivided mass. which if large will be removed with difficulty. To obviate this inconvenience, it may when partially hardened be cut into as many parts or sections as will be necessary to make it easily portable, or it may be cast in sections by previously setting in the mould as many very thin strips of board (sheet iron is perhaps better) as will serve for partitions to divide the cover into as many sections as are wanted. The upper edges of these partitions should be arched corresponding with the mould above which they should be elevated to a height equal to the designed thickness of the cover.

'21. 9320X 1-15-1836

2.

They should be inserted edgewise in the mould extending like radii
from the apex to the base; or if the frame for the aperture occupy the cen-
tral part of the mould, then they should extend from the frame to the
base. — After this preparation cast on the cement as before, and the
cover will be divided into several wedge shaped sections which when suf-
ficiently seasoned may be removed at pleasure to the well or cistern [illegible]
which owing to their exact adaptation to each other produced by the above
described manner of their separation they are easily put together forming
a complete arch or dome.

The Improvement which this applicant claims to have invented con-
sists in making said covers not in the well cistern or other vessel
where they are to be used; but in a shop or suitable manufactory in
which they can have time to season, and from which they can after-
wards be removed to the place of use where they can bear immediate ex-
posure without risk of injury to which those in an unseasoned state
are liable.

[illegible] Witnesses
1/6. G. R. J. Bowdoin
James Bowdoin

Levi Kidder (340 Words)

(Granted January 15. 1836)

[illegible]